US011362722B2

United States Patent
Lin

(10) Patent No.: US 11,362,722 B2
(45) Date of Patent: Jun. 14, 2022

(54) BEAM FAILURE RECOVERY PROCEDURE FOR SECONDARY CELL IN MOBILE COMMUNICATIONS

(71) Applicant: MediaTek Inc., Hsinchu (TW)

(72) Inventor: Guan-Yu Lin, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/999,007

(22) Filed: Aug. 20, 2020

(65) Prior Publication Data
US 2021/0105058 A1  Apr. 8, 2021

Related U.S. Application Data

(60) Provisional application No. 62/909,833, filed on Oct. 3, 2019.

(51) Int. Cl.
| | |
|---|---|
| *H04B 7/06* | (2006.01) |
| *H04W 72/14* | (2009.01) |
| *H04W 76/19* | (2018.01) |
| *H04W 80/02* | (2009.01) |
| *H04W 72/12* | (2009.01) |
| *H04W 76/11* | (2018.01) |
| *H04L 1/00* | (2006.01) |
| *H04W 28/02* | (2009.01) |
| *H04L 1/16* | (2006.01) |

(52) U.S. Cl.
CPC ......... *H04B 7/0695* (2013.01); *H04L 1/0008* (2013.01); *H04L 1/1614* (2013.01); *H04W 28/0278* (2013.01); *H04W 72/1263* (2013.01); *H04W 72/14* (2013.01); *H04W 76/11* (2018.02); *H04W 76/19* (2018.02); *H04W 80/02* (2013.01)

(58) Field of Classification Search
CPC .. H04B 7/0617; H04B 7/0639; H04B 7/0695; H04W 56/001; H04W 72/046; H04W 72/1263; H04W 72/14; H04W 76/19
USPC ................................................... 370/329, 428
See application file for complete search history.

(56) References Cited

U.S. PATENT DOCUMENTS

| | | | | |
|---|---|---|---|---|
| 2020/0266876 A1* | 8/2020 | Yu | ........................ | H04B 7/0695 |
| 2020/0267048 A1* | 8/2020 | Yu | ........................ | H04B 7/0695 |
| 2020/0267797 A1* | 8/2020 | Wei | ........................ | H04W 76/19 |
| 2021/0013948 A1* | 1/2021 | Agiwal | ................ | H04W 76/19 |
| 2021/0028849 A1* | 1/2021 | Chin | .................... | H04B 7/0617 |
| 2021/0029724 A1* | 1/2021 | Tsai | .................... | H04W 72/046 |
| 2021/0068162 A1* | 3/2021 | Agiwal | ................ | H04B 7/0617 |

* cited by examiner

*Primary Examiner* — Harun Chowdhury
(74) *Attorney, Agent, or Firm* — Han IP PLLC; Andy M. Han

(57) ABSTRACT

An apparatus detects a beam failure of a serving cell. In response, the apparatus triggers a beam failure recovery request (BFRQ). The BFRQ remains pending until cancelled. In triggering the BFRQ the apparatus generates a BFRQ medium access control (MAC) control element (CE) and transmits the BFRQ MAC CE to a wireless network using a resource according to an uplink (UL) grant.

12 Claims, 9 Drawing Sheets

DETECT, BY A PROCESSOR OF AN APPARATUS, A BEAM FAILURE OF A SERVING CELL
810

TRIGGER, BY THE PROCESSOR, A BEAM FAILURE RECOVER REQUEST (BFRQ) RESPONSIVE TO THE DETECTING
820

GENERATE A BFRQ MEDIUM ACCESS CONTROL (MAC) CONTROL ELEMENT (CE)
822

TRANSMIT THE BFRQ MAC CE TO A WIRELESS NETWORK USING A RESOURCE ACCORDING TO AN UPLINK (UL) GRANT
824

FIG. 8

BEAM FAILURE RECOVERY PROCEDURE FOR SECONDARY CELL IN MOBILE COMMUNICATIONS

CROSS REFERENCE TO RELATED PATENT APPLICATION

The present disclosure is part of a non-provisional application claiming the priority benefit of U.S. patent application Ser. No. 62/909,833, filed 3 Oct. 2019, the content of which being incorporated by reference in its entirety.

TECHNICAL FIELD

The present disclosure is generally related to mobile communications and, more particularly, to a beam failure recovery (BFR) procedure for secondary cell (SCell) in mobile communications.

BACKGROUND

Unless otherwise indicated herein, approaches described in this section are not prior art to the claims listed below and are not admitted as prior art by inclusion in this section.

At present time, it is agreed under the 3$^{rd}$ Generation Partnership Project (3GPP) that if a user equipment (UE) detects beam failure for a SCell, the UE can send a scheduling request (SR)-like indication to a network in step 1 of a recovery procedure to inform the network of such beam feature. In step 2 of the recovery procedure, the UE sends a medium access control (MAC) control element (CE) which carries beam failure information such as the identification (ID) of a serving cell with beam failure. The MAC CE can also include new beam information if the serving cell with beam failure has new candidate beams, different from the failed serving beam, with a power level above a reference signal received power (RSRP) threshold.

However, the MAC CE format for a beam failure recovery request (BFRQ) is not yet determined. Moreover, the triggering and cancelling conditions for BFRQ and SR-like indication have not yet been clearly defined. Furthermore, the prioritization rule when physical uplink control channel (PUCCH) for the SR-like indication is overlapped with PUCCH for normal SR/physical random access channel (PRACH)/physical uplink shared channel (PUSCH) have not yet been clearly defined.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to a BFR procedure for SCell in mobile communications. Under various schemes described in the present disclosure, some MAC CE formats for BFRQ are introduced, conditions for triggering and cancelling BFRQ and SR-like indication are proposed, and prioritization rules are proposed for situations in which a PUCCH for a SR-like indication is overlapped with a PUCCH for a normal SR/PRACH/PUSCH.

In one aspect, a method may involve a processor of an apparatus detecting a beam failure of a serving cell. The method may also involve the processor triggering a BFRQ responsive to the detecting. The BFRQ may remain pending until cancelled. In triggering the BFRQ, the method may involve the processor generating a BFRQ MAC CE and transmitting the BFRQ MAC CE to a wireless network using a resource according to an uplink (UL) grant.

In another aspect, a method may involve a processor of an apparatus detecting a beam failure of a SCell. The method may also involve the processor triggering a BFRQ responsive to the detecting. The BFRQ may remain pending until cancelled.

It is noteworthy that, although description provided herein may be in the context of certain radio access technologies, networks and network topologies such as 5th Generation (5G) and New Radio (NR), the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Narrow Band Internet of Things (NB-IoT) and Industrial Internet of Things (IIoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 6 is a diagram of an example scenario in accordance with an implementation of the present disclosure.

FIG. 8 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to a BFR procedure for SCell in mobile communications. According to the present disclosure, a number of possible solutions may be implemented separately or jointly. That is, although these possible solutions may be described below separately, two or more of these possible solutions may be implemented in one combination or another.

Figure 1:
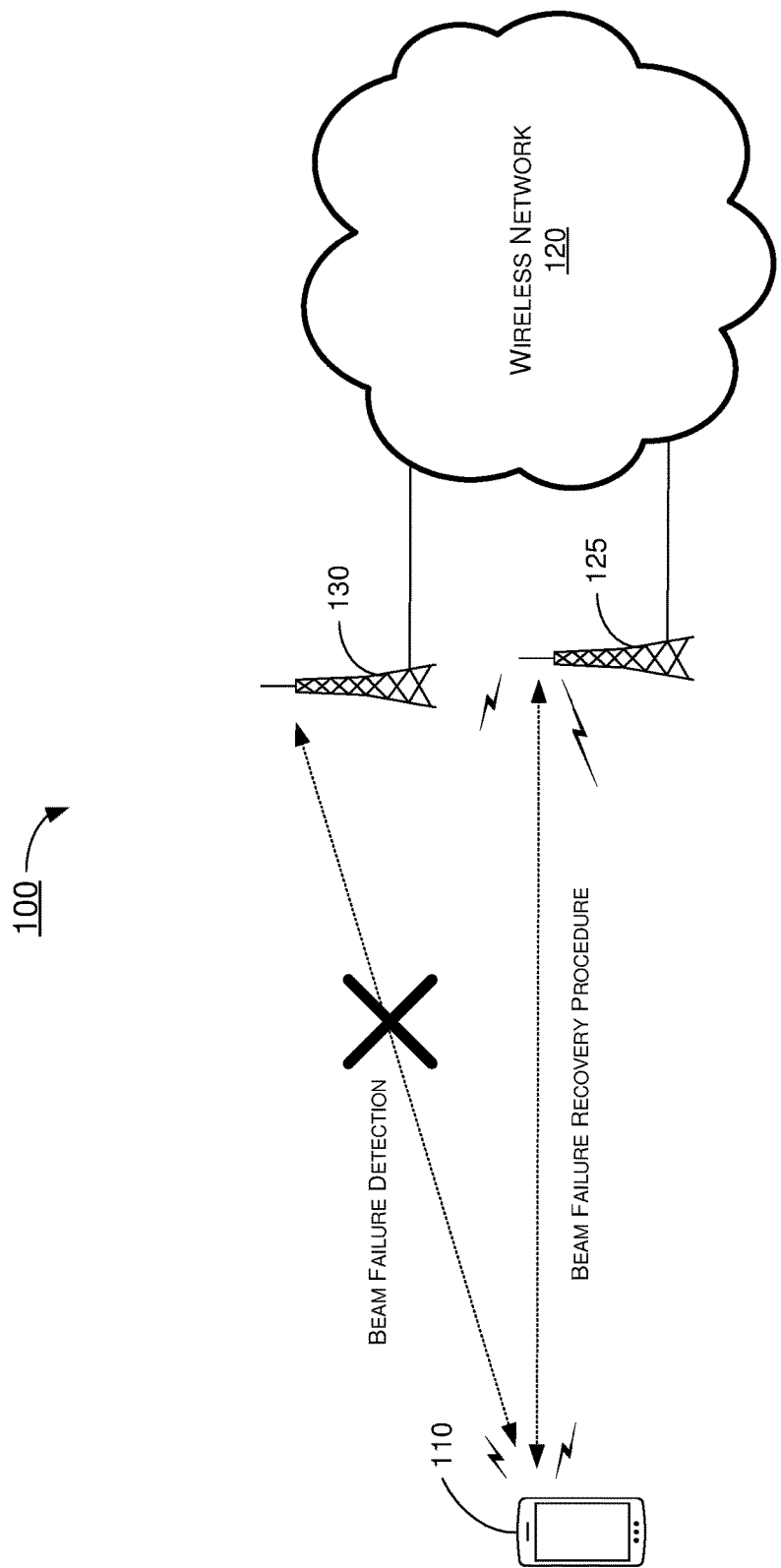
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2, FIG. 3, FIG. 4, FIG. 5 and FIG. 6 illustrate an example scenario 200, an example BFR procedure 200, and scenarios 300, 400 and 500, respectively, in accordance with implementations of the present disclosure. Each of scenario 200, procedure 300, and scenarios 300, 400 and 500 may be implemented in network environment 100. The following description of various proposed schemes is provided with reference to FIG. 1-FIG. 6.

Referring to FIG. 1, network environment 100 may involve a UE 110 in wireless communication with a wireless network 120 (e.g., a 5G NR mobile network). UE 110 may be in wireless communication with wireless network 120 via a primary cell (PCell), or a special cell (SpCell), and a SCell associated with a base station or network node 125 (e.g., an eNB, gNB or transmit-receive point (TRP)) and a base station or network node 130 (e.g., an eNB, gNB or TRP), respectively. UE 110 and wireless network 120 (e.g., via network node 125) may perform BFR procedure for SCell based on any of the proposed schemes in accordance with the present disclosure described below.

Figure 2:
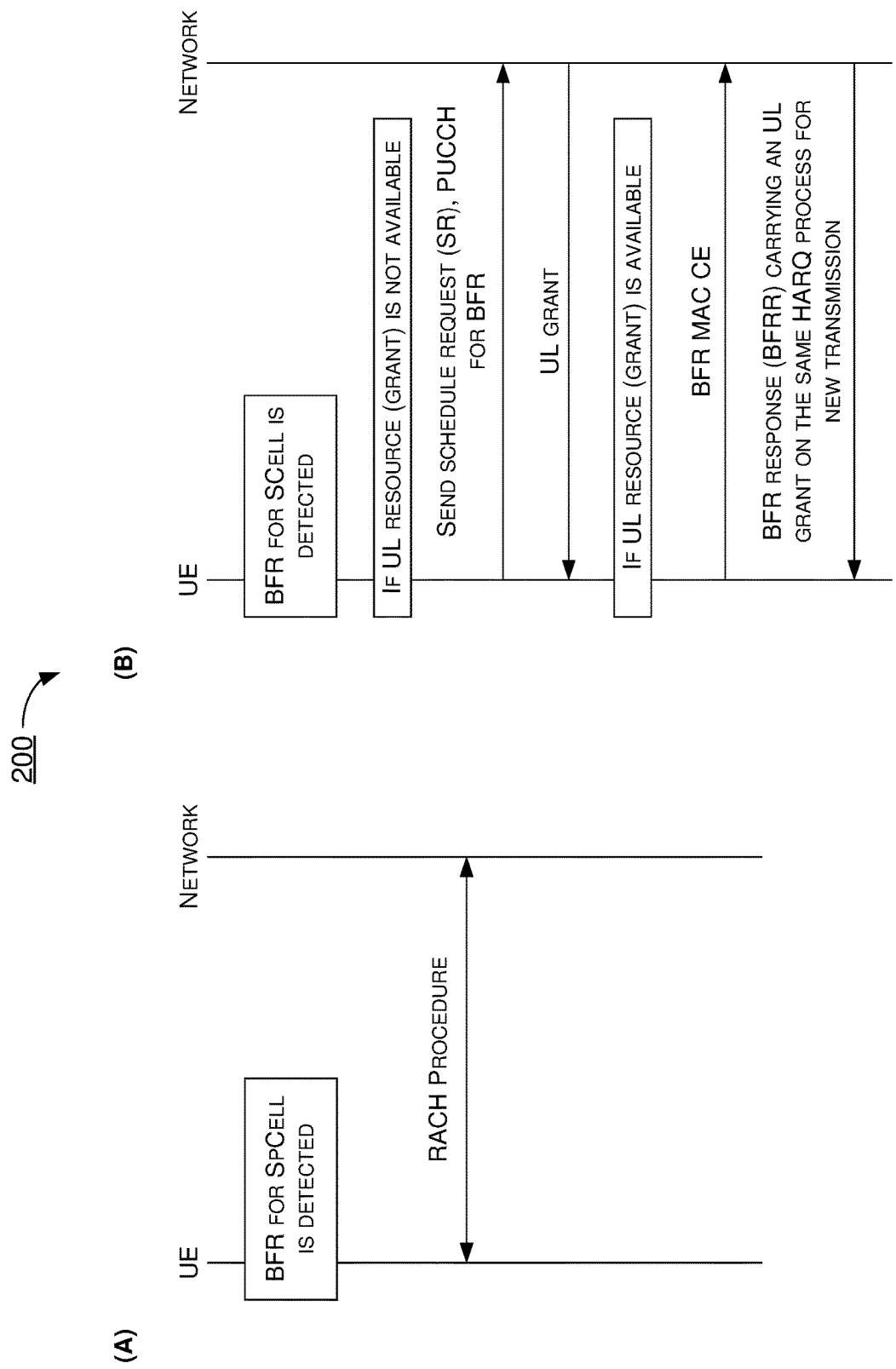
FIG. 2 is a diagram of an example scenario in accordance with an implementation of the present disclosure.

FIG. 2 illustrates an example scenario 200 in accordance with an implementation of the present disclosure. Part (A) of FIG. 2 shows an example of BFR for a SpCell. Part (B) of FIG. 2 shows an example of BFR for a SCell. Referring to part (A) of FIG. 2, when UE 110 detects BFR for a SpCell, UE 110 may perform a random access channel (RACH) procedure with wireless network 120. Referring to part (B) of FIG. 2, when UE 110 detects BFR for a SCell, the actions taken may depend on whether any UL resource (e.g., UL grant) is available. In case UL resource is not available, UE 110 may transmit a scheduling request (SR) using a physical uplink control channel (PUCCH) to report the detected BFR. In response, wireless network 120 may transmit an UL grant to UE 110. In case UL resource is available, UE 110 may transmit a BFRQ MAC CE to wireless network 120. In response, wireless network 120 may transmit a BFR response (BFRR) to UE 110. The BFRR may carry an UL grant on the hybrid automatic repeat request (HARQ) process for new transmission same as the HARQ process UE previously used to transmit BFRQ MAC CE. The term "serving cell" herein refers to a PCell, a SpCell or a SCell (e.g., serving cell=SCell+SpCell (PCell)). The term "SCell" (or "secondary cell") herein refers to one or more other serving cells except for the SpCell (e.g., PCell).

With respect to detection of SCell beam failure, UE 110 may, at a physical layer of the Open Systems Interconnection (OSI) model, monitor a reference signal for a given SCell. In case the physical layer of UE 110 detects that a reference signal received power (RSRP) of the reference signal is very low (e.g., lower than a threshold level), the physical layer may indicate "beam failure instance indication" to a MAC layer of UE 110. The MAC layer may calculate a duration since the last time a beam failure instance indication was received from the physical layer. Moreover, the MAC layer may increment a beam failure indication (BFI) counter (BFI_COUNTER) by 1. When the BFI counter reaches a predetermined threshold, the MAC layer may consider that a beam failure for a serving cell is detected. In case the serving cell with beam failure detected is a SCell, UE 110 may trigger BFR and carry out a BFR procedure in accordance with the present disclosure. In case the serving cell with beam failure detected is a SpCell, UE 110 may trigger a RACH procedure (e.g., by carrying out legacy operations as specified in Release 15 (Rel-15) of the 3GPP specification). In case the MAC layer does not receive any beam failure instance for a long time for a serving cell until a timer (e.g., beamFailureDetectionTimer) of this serving cell expires since the last reception of a beam failure instance for this serving cell, UE 110 may consider that beam failure for this serving cell is resolved (e.g., due to no consecutive beam failure instances received from the physical layer), and the MAC layer may reset the BFI counter for this serving cell.

Figure 3:
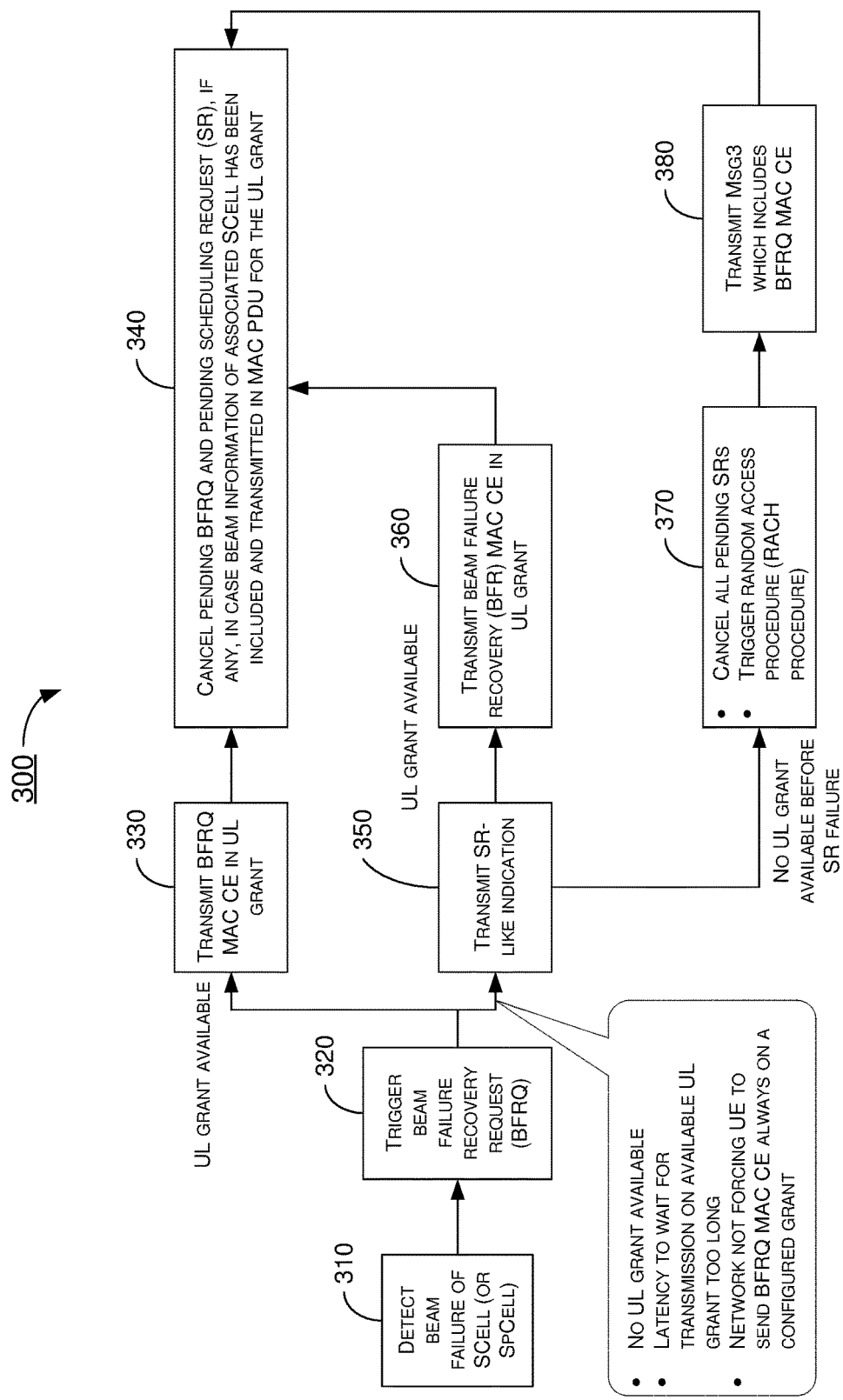
FIG. 3 is a diagram of an example BFR procedure in accordance with an implementation of the present disclosure.

FIG. 3 illustrates an example BFR procedure 300 in accordance with the present disclosure. Procedure 300 may be an example implementation of BFR for a SCell shown in part (B) of FIG. 2. Procedure 300 may include one or more operations, actions, or functions as represented by one or more of blocks 310, 320, 330, 340, 350, 360, 370 and 380. Although illustrated as discrete blocks, various blocks of procedure 300 may be divided into additional blocks, combined into fewer blocks, or eliminated, depending on the desired implementation. For simplicity and in the interest of brevity, description of procedure 300 below is provided from the perspective of UE 110 in the context of network environment 100. Procedure 300 may begin at 310.

At 310, procedure 300 may involve UE 110 detecting beam failure with respect to a SCell or SpCell (e.g., SCell or SpCell associated with network node 130). Procedure 300 may proceed from 310 to 320.

At 320, procedure 300 may involve UE 110 triggering a beam failure recovery request (BFRQ), which remains pending until canceled, to inform wireless network 120 of the detected beam failure. Procedure 300 may proceed from 320 to 330 or 350 depending on whether certain conditions are met or not met.

At 330, in an event that UL grant is available (e.g., previously configured by wireless network 120), procedure 300 may involve UE 110 generating a BFRQ MAC control element (CE) to be included in a MAC protocol data unit (PDU) and transmitting the MAC PDU, with the BFRQ MAC CE included therein, to wireless network 120 (e.g., via network node 125) in the UL grant (e.g., using resources configured in the UL grant). Procedure 300 may proceed from 330 to 340.

At 340, in an event that beam information of the associated SCell (or SpCell) has been included and transmitted in the MAC PDU in the UL grant, procedure 300 may involve UE 110 canceling the pending BFRQ and any SR-like indication associated with this SCell (or SpCell).

At 350, procedure 300 may involve UE 110 immediately transmitting a SR-like indication to wireless network 120 for the pending BFRQ. Alternatively, procedure 300 may involve UE 110 transmitting the SR-like indication to wireless network 120 in an event that one or more of certain conditions have been met. Such conditions may include, for example and without limitation, the following: (1) no UL grant being available (e.g., no UL shared channel (UL-SCH) resource available for a new transmission), (2) latency due to waiting for transmission on any available UL grant being too long (e.g., UL-SCH available for a new transmission not meeting latency requirement(s) for SCell (or SpCell) BFRQ transmission), and (3) wireless network 120 not forcing UE 110 to transmit BFRQ MAC CE always on a configured grant (e.g., MAC entity configured with configured UL grant(s) and UE 110 not configured to always transmit a BFRQ MAC CE with a configured grant). Procedure 300 may proceed from 350 to 360 or 370, depending on whether any UL grant is available. Besides, the condition for UE 110 transmitting the SR-like indication may include that UE has scheduled UL grant, but the UL grant has no sufficient room to include non-truncated and truncated BFR MAC CE as a result of logical channel prioritization (LCP) procedure.

At 360, in an event that there is UL grant available, procedure 300 may involve UE 110 transmitting the BFRQ MAC CE to wireless network 120 using the available UL grant. Procedure 300 may proceed from 360 to 340.

At 370, in an event that there is no UL grant available before detection of the beam failure, procedure 300 may involve UE 110 triggering a contention-based random access (CBRA) procedure on a SpCell. Procedure 300 may also involve UE 110 cancelling all pending SRs (except for pending SR-like indication described above). Procedure 300 may proceed from 370 to 380.

At 380, procedure 300 may involve UE 110 transmitting a message 3 (Msg3) to wireless network 120 in the CBRA procedure with a BFRQ MAC CE included in the Msg3. Procedure 300 may proceed from 380 to 340.

Various schemes proposed herein may be utilized in implementing BFR procedure 300, as described below.

Under a proposed scheme in accordance with the present disclosure, a SR-like indication for SCell BFR (or SpCell BFR) may be transmitted using a PUCCH resource configured for the SR-like indication. Under the proposed scheme, the PUCCH may be configured according to a SR configuration dedicated for SCell BFR (or SpCell BFR). The SR configuration may include, for example and without limitation, sr-ProhibitTimer, sr-TransMax, and SR_COUNTER.

Figure 4:
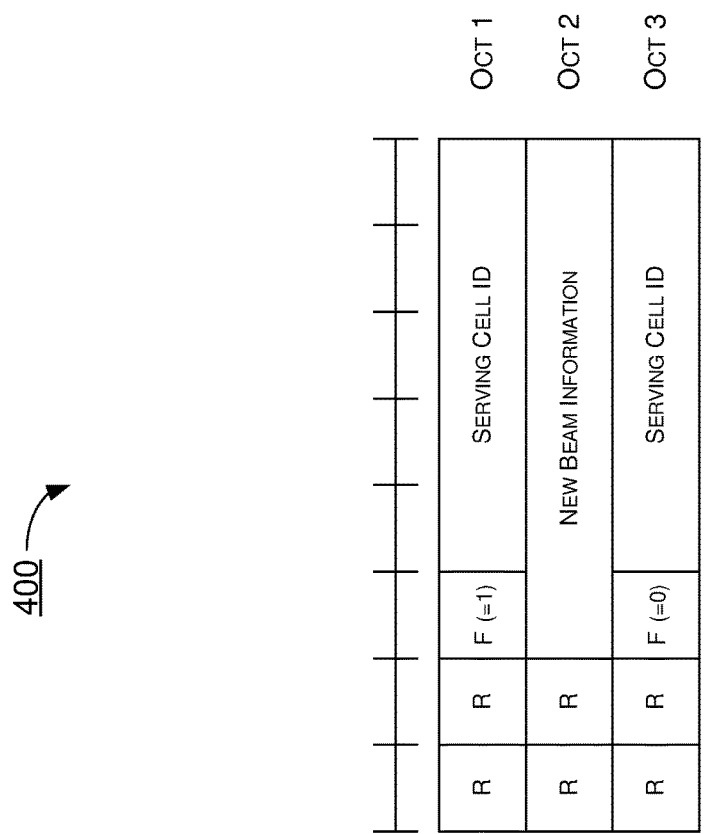
FIG. 4 is a diagram of an example scenario in accordance with an implementation of the present disclosure.

Under a proposed scheme in accordance with the present disclosure, with respect to a format of MAC CE for BFRQ, beam failure information may be enumerated for each SCell with beam failure one-by-one. FIG. 4 illustrates an example scenario 400 in accordance with an implementation of the present disclosure with respect to MAC CE format for BFRQ. Referring to FIG. 4, which shows a first option of an example MAC CE format, an F field may be utilized to indicate whether or not new beam information (e.g., information of one or more qualified new beam) for a serving cell identified by the serving cell ID field is provided. Under the proposed scheme, truncation of BFRQ MAC CE may be supported. For instance, there may be two logical channel identities (LCIDs) separately to distinguish truncated BFRQ MAC CE and non-truncated BFRQ MAC CE. There may be indication in LCID/MAC subheader/MAC payload to indicate to a network (e.g., wireless network 120) how many serving cells should be reported, based on which the network may determine whether there is truncation. Under the proposed scheme, it may be inferred from truncated BFRQ MAC CE that some beam failure information may not be provided (e.g., due to limit on UL grant size). For example, serving cell ID and new beam information of a serving cell may be not provided at all. As another example, for a serving cell with beam failure, the serving cell ID may be provided but there may be no room to report the new beam information (e.g., the F field is set to "1" but new beam information is not included).

Figure 5:
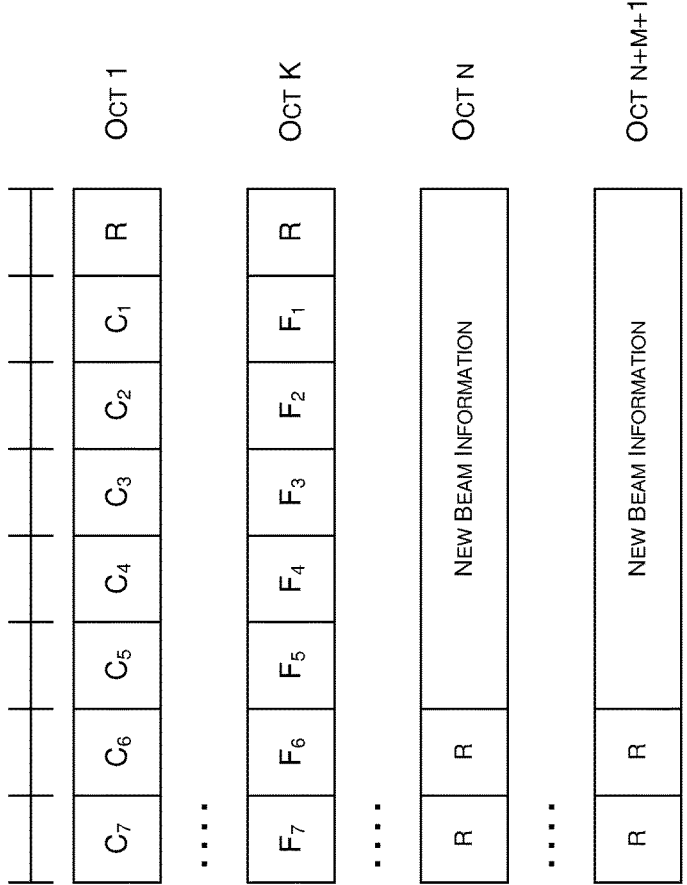
FIG. 5 is a diagram of an example scenario in accordance with an implementation of the present disclosure.

Under a proposed scheme in accordance with the present disclosure, with respect to a format of MAC CE for BFRQ, two bitmaps may be utilized to separately indicate the following information: (i) whether a SCell has beam failure, and (ii) whether beam information of a SCell with beam failure is provided. FIG. 5 illustrates an example scenario 500 in accordance with an implementation of the present disclosure with respect to MAC CE format for BFRQ. Referring to FIG. 5, which shows a second option of an example MAC CE format, a $C_i$ field may be utilized to indicate whether or not the serving cell with ServCellIndex i has beam failure, and an $F_i$ field may be utilized to indicate whether or not the new beam information for the serving cell with ServCellIndex i is provided. Alternatively, an $F_i$ field may be utilized to indicate whether or not the i-th serving cell reported with beam failure has new beam information or not. Accordingly, the use of $F_i$ would be viable when the value of $C_i$ is 1. Under the proposed scheme, the number of bytes for $C_i$ and $F_i$ may depend on actual implementation. For example, in power headroom report (PHR) format, a one-byte bitmap may be sufficient in case the highest ServCellIndex of the serving cell with configured uplink is less than 8. Under the proposed scheme, truncation of BFRQ MAC CE may be supported. For instance, there may be two LCIDs separately to distinguish truncated BFRQ MAC CE and non-truncated BFRQ MAC CE. Under the proposed scheme, it may be inferred from truncated BFRQ MAC CE that omits one or more pieces of information related to the detected beam failure (e.g., due to limit on UL grant size). For example, a bitmap for $C_i$ may not be completely provided for each serving cell. Alternatively, a bitmap for $C_i$ may be completely included, but a bitmap for $F_i$ may not be completely included. Alternatively, bitmaps for $C_i$ and $F_i$ may be completely included, with a portion (but not entirety) of new beam information included in the same MAC PDU.

Figure 6:
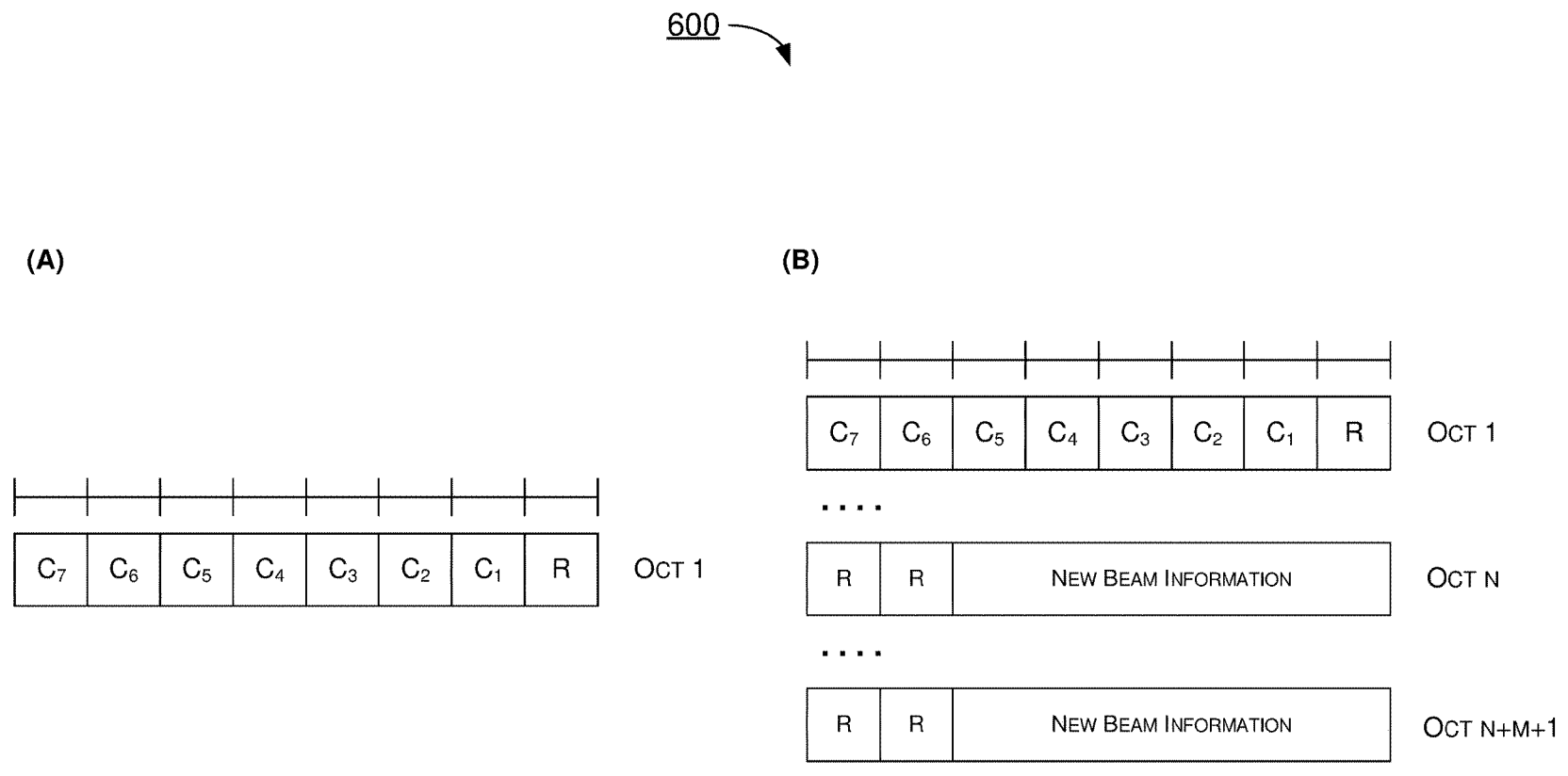

Under a proposed scheme in accordance with the present disclosure, with respect to a format of MAC CE for BFRQ, separate LCIDs or flags in header or payload may be utilized to separately indicate failed serving cell with new beam information and failed serving cell without new beam information, respectively. FIG. 6 illustrates an example scenario 600 in accordance with an implementation of the present disclosure with respect to MAC CE format for BFRQ. Referring to FIG. 6, a third option of an example MAC CE format is shown. In particular, part (A) of FIG. 6 shows an example format indicating a serving cell without new beam information, and part (B) of FIG. 6 shows an example format indicating a serving cell with new beam information. Referring to FIG. 6, a R field may be a reserved bit set to 0. When used as a flag, the value of the R field may be set to either 0 or 1. When set to 1, the MAC CE may indicate failed serving cell along with information of qualified new beam(s). When set to 0, the MAC CE may indicate failed serving cell without information of any qualified new beam. Referring to FIG. 6, a $C_i$ field may be utilized to indicate whether or not the serving cell with ServCellIndex i has beam failure. In case the MAC CE is indicated as including new beam information, the new beam information may be provided after the $C_i$ field in the MAC CE format in an order corresponding to serving cell with a corresponding $C_i$ set to 1. Under the proposed scheme, truncation of BFRQ MAC CE may be supported. For instance, there may be two LCIDs separately to distinguish truncated BFRQ MAC CE and non-truncated BFRQ MAC CE. Under the proposed scheme, it may be inferred from truncated BFRQ MAC CE that some beam failure information may not be provided (e.g., due to limit on UL grant size). For example, a bitmap for $C_i$ may not be completely provided for each serving cell. Alternatively, bitmaps for $C_i$ may be completely included, with a portion (but not entirety) of new beam information included in the same MAC PDU.

Under a proposed scheme in accordance with the present disclosure, a fourth option of an example MAC CE format may involve a short BFRQ MAC CE format. Under the proposed scheme, due to MAC PDU size limit, a short format may enable UE 110 to report limited information with merely a few bytes. The term "short" herein may refer to a situation in which one serving cell (and not more) has failed. The term "short truncated" herein may refer to a situation in which UE 110 has more than one serving cell failed but only one of the serving cell is reported. Under the proposed scheme, UE 110 may include in the BFRQ MAC CE beam failure information of only one serving cell. Under a first approach, UE 110 may always report serving cell ID only even if there is new beam qualified to be reported for the serving cell. A one-bit flag may be included in the payload to indicate whether or not there is new beam information unreported. Under a second approach, in a first sub-format (sub-format 1) UE 110 may report serving cell ID only in case a serving cell has no qualified new beam to report. Alternatively, in a second sub-format (sub-format 2) UE 110 may report serving cell ID along with new beam information in case a serving cell has qualified new beam(s) to report. To distinguish the two sub-formats, a number options may be considered, including: (a) using separate LCIDs, (b) using flag(s) in the payload, (c) using one bit to indicate in the MAC subheader (e.g., the R/F/LCID/F format), and (d) using the L value to indicate the size (e.g., it is sub-format 1 in case of two bytes; it is sub-format 2 in case of three bytes). The short format may include the number of failed SCell(s) or the number of failed SCell(s) not yet reported.

Under the proposed scheme, a bitmap may be included to indicate the failed SCell (without indicating anything else). The number of bytes of the bitmap may depend on the highest ID of the SCell which is activated, hence the network (e.g., wireless network 120) is aware of the bitmap size. In case MAC PDU has enough size to include the entire bitmap plus one additional byte, the MAC CE may include one byte of MAC subheader (e.g., R/R/LCID) plus the bitmap. Otherwise, the MAC CE may include two bytes of MAC subheader (e.g., R/R/LCID/L) plus part of the bitmap. Separate logical channel identifications (LCIDs) may be used to distinguish the two short formats. An LCID field is a field in a MAC subheader that indicates the purpose of the MAC CE or the MAC service data unit (SDU) payload. Thus, the LCID field may be utilized to indicate that the MAC CE is a BFRQ MAC CE.

Under a proposed scheme in accordance with the present disclosure, with respect to indication for a SpCell BFR, a BFRQ MAC CE may be designed to support indication of SpCell BFR. For instance, in case UE 110 triggers CBRA due to SpCell BFR, and in case there is also SCell failure during the RACH procedure, UE 110 may use the BFRQ MAC CE to indicate both SCell BFR and SpCell BFR. Similarly, in case a SCell BFR triggers CBRA, and in case beam failure is detected on SpCell during the RACH procedure, UE 110 may use the BFRQ MAC CE to indicate SpCell BFR. Under the proposed scheme, in the BFRQ MAC CE, UE 110 may indicate the beam failure of SpCell by indicating the serving cell index of SpCell (e.g., cell ID=00000) or, alternatively, UE 110 may set the bitmap for ID 0 as 1 to inform wireless network 120 of BFR on the SpCell (e.g., not setting the $C_i$ for cell ID 0 as R, reserved bit).

Under a proposed scheme in accordance with the present disclosure, with respect to priority of BFR MAC CE, one of a number of options may be taken. For instance, under a first option (option 1), the priority of BFRQ MAC CE may be placed below the cell radio network temporary identifier (C-RNTI) MAC CE or data from uplink common control channel (UL-CCCH) and above the configured grant confirmation MAC CE. Under a second option (option 2), the priority of BFRQ MAC CE may be placed below configured grant confirmation MAC CE and above MAC CE for buffer status report (BSR), with exception of BSR included for padding. Under a third option (option 3), the priority of BFRQ MAC CE may be at the same level as C-RNTI MAC CE or data from UL-CCCH. It is noteworthy that, as BFRQ MAC CE may have several formats (e.g., distinguished by LCID, truncated versus non-truncated, or short format versus long format), different formats of BFRQ MAC CE may have the same priority or different priorities.

Under a proposed scheme in accordance with the present disclosure, with respect to dedicated resource for BFRQ transmission, wireless network 120 may configure UE 110 with a configured grant (e.g., type 1 or type 2) dedicated for transmitting BFRQ MAC CE. Under the proposed scheme, wireless network 120 may configure a resource pool which is dedicated for BFRQ transmission via two-step RACH. For instance, message A (MsgA) in the two-step RACH may include C-RNTI MAC CE and BFRQ MAC CE.

Under a proposed scheme in accordance with the present disclosure, with respect to triggering of a BFRQ, BFRQ for a given SCell with beam failure may be triggered when beam failure for that SCell is detected. Moreover, once the BFRQ for a given SCell is triggered, the triggered BFRQ may remain pending until it is canceled. Under the proposed scheme, with respect to cancellation of a pending BFRQ, one of a number of options may be taken. For instance, under a first option (option 1), a pending BFRQ may be canceled when beam information of all serving cells with beam failure associated with the pending BFRQ is included in a MAC PDU which has been transmitted to a network (e.g., wireless network 120). Under a second option (option 2), a pending BFRQ may be canceled when: (1) beam information of all serving cells with beam failure associated with the pending BFRQ is transmitted in a MAC PDU, (2) UE 110 receives a HARQ acknowledgement (ACK) from wireless network 120 or receives a new UL grant which is on the same HARQ process of the same serving cell as a previously transmitted MAC PDU in which a BFRQ MAC CE is included. For example, after the MAC PDU including BFRQ MAC CE associated with the pending BFRQ is transmitted, the pending BFRQ may still be pending (i.e. not cancelled) but may be suspended. A new timer may be introduced. The new timer may be started when the BFRQ MAC CE is transmitted. During the timer is running, UE 110 may not transmit more BFRQ MAC CE for BFRQ associated with the same serving cell(s) with beam failure. In case UE 110 receives a HARQ ACK or a new UL grant from wireless network 120 on the same HARQ process of the same serving cell before the timer expires, the timer may be stopped and the pending BFRQ whose beam failure information of the associated SCell with beam failure is included in that MAC PDU may be canceled. In contrast, in case UE 110 does not receive HARQ ACK or new UL grant on the same HARQ process of the same serving cell before timer expiration, UE 110 may continue the pending BFRQ (e.g., by continuing to transmit BFRQ MAC CE). In another example, after the MAC PDU including BFRQ MAC CE associated with the pending BFRQ is transmitted, the pending BFRQ may is cancelled or the new timer is started. If there is no NAC response (e.g. HARQ ACK or UL grant on the same HARQ process is received) upon timer expiration, UE 110 may re-trigger the BFRQ for the serving cell(s) whose beam failure information was transmitted without response from the network.

Under a proposed scheme in accordance with the present disclosure with respect to triggering of a SR-like indication, when a BFRQ has been triggered, UE 110 may trigger a SR-like indication for SCell BFR in case one or more of a number of conditions has/have been met. Such conditions may include, for example and without limitation: (1) there being no UL-SCH resource available for a new transmission, (2) the MAC entity being configured with configured UL grant(s) and UE 110 having been configured to always transmit a BFRQ MAC CE with a configured grant, and (3) the UL-SCH resource available for a new transmission not meeting requirement(s) for SCell BFRQ transmission. The configured UL grant may be a general configured grant that may be used to transmit data or, alternatively, a configured grant dedicated for BFRQ transmission. The requirement(s) for SCell BFR may be one or more of the following: (1) latency requirement, which may be defined as the PUSCH duration of the UL grant, the period duration to the start of the PUSCH, or the period duration to the end of the PUSCH, (2) serving cell restriction, which may involve wireless network 120 configuring UE 110 to send BFRQ on a selected serving cell without beam failure, and (3) remaining UL grant size restriction, which may be defined as the number of bits or bytes for UE to include the minimum set of beam failure information as a result of logical channel prioritization (LCP) procedure. Another alternative may be that, in case a BFRQ has been triggered, UE 110 may immediately trigger a SR-like indication for the pending BFRQ. The intention is to ensure that wireless network 120 can be informed of SCell failure as soon as possible.

Under a proposed scheme in accordance with the present disclosure with respect to cancellation of a SR-like indication, different SCells may trigger separate BFRQs and separate SR-like indications. When a SR-like indication is triggered, it may remain pending until it is canceled. Under the proposed scheme, the SR-like indication may be canceled in case a MAC PDU including the BFRQ information of the corresponding SCell is transmitted. Those pending SR-like indications whose BFRQ information is not included in the transmitted MAC PDU may remain pending. Under the proposed scheme, in case transmission of a SR configuration for SCell BFR reaches a maximum number of PUCCH transmissions configured for the applied SR configuration, UE 110 either may trigger CBRA on a SpCell or may not trigger CBRA on the SpCell. In an event that UE 110 triggers CBRA on the SpCell, UE 110 may also perform one of the following: (1) canceling all pending SRs, (2) canceling all pending SRs for normal SR and not cancelling all pending SRs for SCell BFR, (3) canceling the pending SR whose SR configuration suffers from SR failure, and (4) continuing to transmit SR for the SR configuration for SCell BFR which exceeds the transmission limit. In an event that UE 110 does not trigger CBRA on the SpCell, UE 110 may also perform one of the following: (1) canceling the pending SR whose SR configuration suffers from SR failure, and (2) not cancelling the pending SR-like indication and continuing to perform the corresponding SR transmission. Under the proposed scheme, in case SR transmission for a normal SR already reaches its maximum number of PUCCH transmissions, UE 110 may trigger CBRA on the SpCell. Additionally, UE 110 may either cancel all pending SRs including pending SR for SCell BFR or cancelling all pending SRs except for the pending SR for SCell BFR. The MAC entity may stop the ongoing RACH procedure by BFR for SCell in case all beam failure information associated with all serving cell(s) with beam failure is transmitted with UL grant(s) not provided by random access response (RAR).

Under a proposed scheme in accordance with the present disclosure, with respect to handling of pending SR when there is no dedicated SR configuration for BFR, UE 110 may, in case the MAC entity has no valid PUCCH resource configured for the pending SR-like indication, the handling of pending SR may be avoided by wireless network 120. For instance, in case PUCCH dedicated for SCell BFR is not configured, SCell BFR by SR-like indication may not be supported. Additionally, in case wireless network 120 decides to support the function of SCell BFR, PUCCH resource for BFR may be a mandatory field. Under the proposed scheme, an alternative approach may be for UE 110 to transmit a SR on a normal SR resource. For instance, in case any SR configuration for data is configured for UE 110, UE 110 may utilize such SR configuration to transmit the SR. In case any SR configuration associated with a high-priority data is configured for UE 110, UE 110 may utilize such SR configuration to transmit the SR. For instance, a SR configuration may be configured for UE 110 to request resource for both purposes: for UL data transmission (normal SR procedure) and for BFRQ transmission.

Under the proposed scheme, another alternative approach may be for UE 110 to trigger RACH. For instance, UE 110 may trigger RACH even though there is SR configuration configured for a normal SR. Alternatively, UE 110 may trigger RACH only when there is no SR configuration configured for the normal SR. Still alternatively, UE 110 may trigger RACH only when there is no high-priority SR configuration configured for the normal SR. In case there is high-priority SR configuration configured for normal SR, UE 110 may use the normal SR to request UL resource. Under the proposed scheme, in case RACH is triggered, whether or not UE 110 cancels the SR for BFR SCell, UE 110 may either cancel the SR or not cancel the SR. Under the proposed scheme, with respect to triggering the RACH, UE 110 may trigger CBRA on SpCell. Alternatively, UE 110 may trigger contention-free random access (CFRA) on SpCell where CFRA resource is configured and dedicated for SCell BFR report. Still alternatively, in case CFRA resource dedicated for SCell BFR is not configured, UE 110 may trigger CBRA on SpCell.

Under a proposed scheme in accordance with the present disclosure, with respect to prioritization of SR transmission for SCell BFR, UE 110 may be allowed to send PUCCH even though the PUCCH overlaps with a measurement gap. For instance, PUCCH may be prioritized over a UL-SCH transmission in some cases in an event that piggybacking is not possible. For instance, PUCCH may be prioritized over the UL-SCH in case UL-SCH resource is not used to transmit ultra-reliable low-latency communication (URLLC) traffic, of in case the UL-SCH resource is not carrying data with a high priority (e.g., based on quality of service (QoS) requirement of the traffic or the logical channel priority). Moreover, the SR-like indication may be assigned with a relatively high priority. In an event that UL-SCH has an even higher priority than the SR-like indication, UL-SCH may be transmitted; otherwise, PUCCH may be transmitted.

Under a proposed scheme in accordance with the present disclosure, with respect to handling of multiple SR-like indications for SCell BFR, there may be one or more SR configurations dedicated for SCell BFR configured for each MAC entity. Under the proposed scheme, SCell BFRQ for different serving cells may trigger separate SR-like indications on a one-SR-indication-per-SCell basis. Under the proposed scheme, SR-like indications for different serving cells may utilize separate SR configurations or share the same SR configuration for SCell BFR. That is, each SR configuration may be per serving cell, per PUCCH cell group, or per cell group (per MAC entity). In case more than one individual SR-like indication triggers an instruction from the MAC entity to the physical layer to signal the SR on the same valid PUCCH resource, the SR_COUNTER for the relevant SR configuration may be incremented only once.

Under a proposed scheme in accordance with the present disclosure, with respect to prioritization when overlap between PUCCHs occur, there may be a number of options when a PUCCH of the SR-like indication for BFR overlaps with a PUCCH for a normal SR. Under a first option (option 1), it may be up to UE implementation for SR-like indication. Under a second option (option 2), the SR-like indication may always be prioritized over the normal SR. Under a third option (option 3), the priority of SR-like indication may be compared to the priority of traffic. For instance, in case the normal SR is not triggered by URLLC traffic or traffic with a sufficiently high priority (e.g., based on QoS requirement of the traffic or the logical channel priority), the priority of SR-like indication may be compared to the priority of such traffic. Alternatively, the SR-like indication may be assigned with a relatively high priority and, in case the normal SR is not triggered by a logical channel (LCH) or a traffic with an even higher priority than the SR-like indication, then SR-like indication for BFR may be transmitted; otherwise, PUCCH for normal SR may be transmitted. Under the proposed scheme, when the PUCCH for multiple SR-like indications for BFR are overlapped, one of two options may be undertaken. Under a first option (option 1), it may be up to UE implementation to select which one to transmit. Under a second option (option 2), UE 110 may select the PUCCH for SR-like indication with (i) the smallest PUCCH duration, (ii) the smallest periodicity, (iii) the smallest latency until the start of PUCCH transmission, or (iv) the smallest latency until the end of PUCCH transmission.

Under a proposed scheme in accordance with the present disclosure, with respect to prioritization when overlap between PUCCH and RACH occurs, there may be a number of options when a PUCCH of the SR-like indication for BFR overlaps with a PRACH resource. Under a first option (option 1), it may be up to UE implementation as to which one to transmit. Under a second option (option 2), detailed rules may be specified. For instance, in case RACH is not for SCell BFR, PCell BFR, handover or for high-priority data, PUCCH for SCell BFR may be prioritized; otherwise, RACH may be prioritized. That is, in an event that PUCCH for SCell BFR is skipped, the MAC layer may update the counter (e.g., minus 1) for each SR skip since the SR transmission is not performed (e.g., in case the physical layer decides to skip PUCCH for SCell BFR, the physical layer may indicate a notification of SR_COUNTER_SUSPEND to the MAC layer).

Under the proposed scheme, when PRACH for SCell BFR is overlapped with PUCCH for normal SR, it may be up to UE implementation as to which one to transmit. Alternatively, detailed rules may be specified. For instance, it may be specified that PRACH is always prioritized for SCell BFR. Alternatively, UE 110 may determine the prioritization based on the highest-priority traffic triggering the SR transmission (e.g., the priority may be based on the logical channel priority, latency requirement or other QoS requirement). Under the proposed scheme, when PRACH for SCell BFR is overlapped with PUCCH for SCell BFR, it may be up to UE implementation as to which one to transmit. Alternatively, detailed rules may be specified. For instance, PRACH may be prioritized or PUCCH may be prioritized.

Under a proposed scheme in accordance with the present disclosure, with respect to prioritization when a RACH procedure is triggered during an ongoing RACH procedure, UE 110 may continue the ongoing RACH for SpCell BFR when the RACH is triggered by SCell BFR and in case there is already a RACH procedure ongoing for SpCell BFR. When RACH is triggered by SCell BFR, in case there is already a RACH procedure ongoing for SCell BFR, UE 110 may continue the ongoing RACH. When RACH is triggered by SCell BFR, in case there is already a RACH procedure ongoing, with the RACH not being for SCell BFR and not being for SpCell BFR, UE 110 may continue the ongoing RACH for SCell BFR. Alternatively, UE 10 may continue the ongoing RACH procedure for SCell BFR in case the ongoing RACH is for handover, high-priority data or SR failure. When RACH procedure for SpCell BFR is triggered, in case there is already an ongoing RACH triggered by SCell BFR, UE 110 may continue the ongoing RACH for SCell BFR. Alternatively, UE 110 may stop the ongoing RACH for SCell BFR and may start the RACH for SpCell BFR. Still alternatively, UE 110 may determine the progress of the ongoing RACH for SCell BFR. In case UE 110 does not receive RAR for the ongoing RACH for SCell BFR, UE 110 may stop the ongoing RACH and may start RACH for SpCell BFR. Otherwise, UE 110 may continue the ongoing RACH. Still alternatively, UE 110 may determine whether UE 110 has dedicated PRACH for SCell BFR and/or SpCell BFR. When a RACH procedure not for BFR is triggered, in case there is already an ongoing RACH triggered by SCell BFR, UE 110 may continue the ongoing RACH for SCell BFR. Alternatively, UE 110 may stop the ongoing RACH for SCell and start a new RACH procedure in case the ongoing RACH is for handover, high-priority data or SR failure.

In view of the above, some highlights of the various proposed schemes in accordance with the present disclosure are summarized below.

In some implementations, when UE 110 detects a beam failure for a SCell, UE 110 may trigger BFRQ, which may remain pending until cancelled. In triggering the BFRQ, UE 110 may generate a BFRQ MAC CE to be included in a MAC PDU to be transmitted to wireless network 120 in an UL grant. When certain condition(s) is/are met, UE 110 may trigger a SR-like indication to wireless network 120 to request for UL resource for BFRQ MAC CE transmission. After transmission of beam failure information for the SCell for which beam failure is detected, UE 110 may cancel the pending BFRQ and SR-like indication for the SCell.

In some implementations, UE 110 may trigger the SR-like indication for SCell BFR in case one or more of the following conditions is/are met: (1) no UL-SCH resource being available for a new transmission, (2) the MAC entity being configured with configured UL grant(s) and UE 110 not being configured to always transmit a BFRQ MAC CE with a configured grant, and (3) the UL-SCH resource(s) available for a new transmission not meeting the requirement for SCell BFRQ transmission.

In some implementations, the configured UL grant may be a general configured grant that may be used to transmit data or may be a configured grant dedicated for BFRQ transmission. Accordingly, wireless network 120 may configure UE 110 to always transmit the BFRQ MAC CE with a general configured grant or a configured grant dedicated for BFRQ MAC CE transmission.

In some implementations, the requirement for triggering the SR-like indication may include one or more of the following: (1) latency requirement, which may be defined as the PUSCH duration of the UL grant, the period/duration to the start of the PUSCH, or the period/duration to the end of the PUSCH, (2) serving cell restriction, which may involve wireless network 120 configuring UE 110 to send BFRQ on a selected serving cell without beam failure, and (3) remaining UL grant size, which means whether UE 110 can include a minimum set of beam failure information in the remaining UL grant size as a result of logical channel prioritization (LCP) procedure.

In some implementations, in case a BFRQ has been triggered as described above, UE 110 may immediately trigger the SR-like indication for the pending BFRQ.

In some implementations, in case a MAC entity has no valid PUCCH resource configured for the pending SR-like indication, UE 110 may trigger a CBRA on a SpCell.

In some implementations, the SR-like indication may not be triggered in case wireless network 120 does not configure UE 110 with a SR configuration dedicated for BFR.

In some implementations, in case a MAC entity has no valid PUCCH resource configured for the pending SR-like indication, UE 110 may signal a SR on a SR configuration for data arrival, if configured.

In some implementations, there may be more than one SR configuration dedicated for SR-like indication for SCell BFR configured for each MAC entity. For example, the SR configuration dedicated for SR-like indication cannot be used to request uplink resource for UL data transmission. For another example, the SR configuration dedicated for SR-like indication can also be used by UE 110 to request uplink resource for UL data transmission.

In some implementations, the SR-like indication may be on a per-SCell basis. Accordingly, SCell BFRQs for different serving cells may respectively trigger different/separate SR-like indications.

In some implementations, the SR-like indications for different serving cells may utilize separate SR configurations or, alternatively, may share a same SR configuration for SCell BFR. That is, the SR configuration may be per serving cell, per PUCCH cell group, and/or per cell group (e.g., per MAC entity).

In some implementations, in case more than one individual SR-like indication trigger an instruction from the MAC entity to the physical layer to signal the SR on the same valid PUCCH resource, the SR_COUNTER for the relevant SR configuration may be incremented only once.

In some implementations, in case transmission of a SR-like indication for SCell BFR has reached a maximum number of PUCCH transmissions configured for the applied SR configuration, UE 110 may trigger CBRA on SpCell and cancel all pending SRs.

In some implementations, in case SR transmission for a normal SR (for data arrival) reaches a maximum number of PUCCH transmissions, UE 110 may trigger CBRA on SpCell and cancel all pending SRs except for the pending SR-like indication for SCell BFR.

In some implementations, a priority of the BFRQ MAC CE may be lower than a priority of a configured grant confirmation MAC CE and higher than a priority of a MAC CE for BSR, with exception of BSR included for padding.

In some implementations, the BFRQ MAC CE may have a short format, which may include the beam failure information regarding one serving cell. Alternatively, or additionally, the BFRQ MAC CE may have a short format, which may include one or more bitmaps indicating the ID(s) of one or more SCells with beam failure.

In some implementations, the BFRQ MAC CE may have two formats. A first format may include only those serving cells without new beam information (e.g., no candidate beam above RSRP threshold). A second format may include only those serving cells with beam failure and with new beam information.

In some implementations, the BFRQ MAC CE may include a truncated format to include part of beam information from all failed SCell(s). Accordingly, UE 110 may select the format in case there is not enough room in the available UL grant to transmit the beam information in its entirety.

Illustrative Implementations

Figure 7:
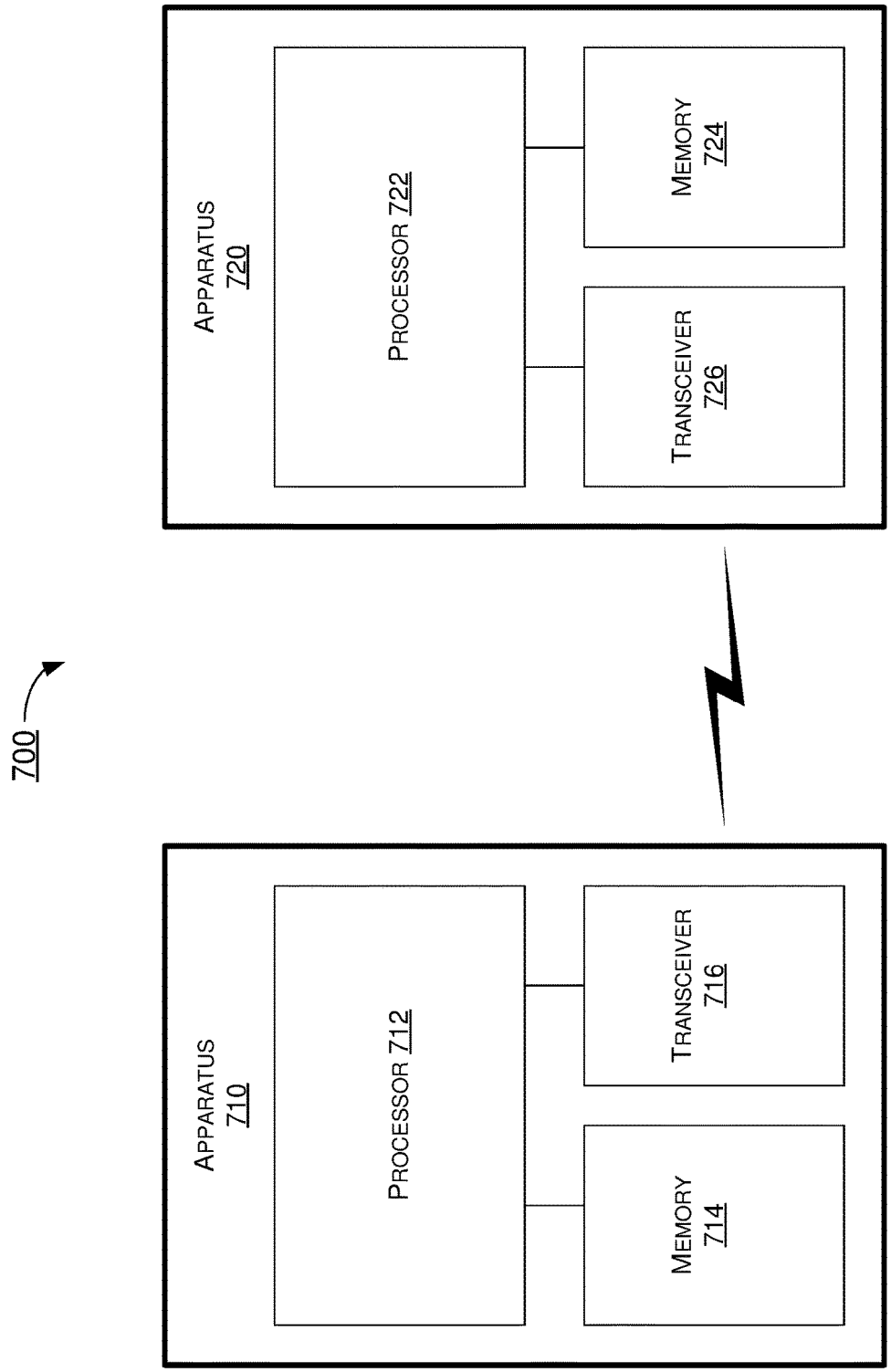
FIG. 7 is a block diagram of an example communication system in accordance with an implementation of the present disclosure.

FIG. 7 illustrates an example system 700 having at least an example apparatus 710 and an example apparatus 720 in accordance with an implementation of the present disclosure. Each of apparatus 710 and apparatus 720 may perform various functions to implement schemes, techniques, processes and methods described herein pertaining to a BFR procedure for SCell in mobile communications, including the various schemes described above with respect to various proposed designs, concepts, schemes, systems and methods described above as well as processes described below. For instance, apparatus 710 may be an example implementation of UE 110, and apparatus 720 may be an example implementation of network node 125.

Each of apparatus 710 and apparatus 720 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 710 and apparatus 720 may be implemented in a smartphone, a smart watch, a personal digital assistant, a digital camera, or a computing equipment such as a tablet computer, a laptop computer or a notebook computer. Each of apparatus 710 and apparatus 720 may also be a part of a machine type apparatus, which may be an IoT apparatus such as an immobile or a stationary apparatus, a home apparatus, a wire communication apparatus or a computing apparatus. For instance, each of apparatus 710 and apparatus 720 may be implemented in a smart thermostat, a smart fridge, a smart door lock, a wireless speaker or a home control center. When implemented in or as a network apparatus, apparatus 710 and/or apparatus 720 may be implemented in a network node (e.g., network node 125), such as an eNB in an LTE, LTE-Advanced or LTE-Advanced Pro network or in a gNB or TRP in a 5G network, an NR network or an IoT network.

In some implementations, each of apparatus 710 and apparatus 720 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 710 and apparatus 720 may be implemented in or as a network apparatus or a UE. Each of apparatus 710 and apparatus 720 may include at least some of those components shown in FIG. 7 such as a processor 712 and a processor 722, respectively, for example. Each of apparatus 710 and apparatus 720 may further include one or more other components not pertinent to the proposed scheme of the present disclosure (e.g., internal power supply, display device and/or user interface device), and, thus, such component(s) of apparatus 710 and apparatus 720 are neither shown in FIG. 7 nor described below in the interest of simplicity and brevity.

In one aspect, each of processor 712 and processor 722 may be implemented in the form of one or more single-core processors, one or more multi-core processors, or one or more RISC or CISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including those pertaining to a BFR procedure for SCell in mobile communications in accordance with various implementations of the present disclosure.

In some implementations, apparatus 710 may also include a transceiver 716 coupled to processor 712. Transceiver 716 may be capable of wirelessly transmitting and receiving data. In some implementations, apparatus 720 may also include a transceiver 726 coupled to processor 722. Transceiver 726 may include a transceiver capable of wirelessly transmitting and receiving data.

In some implementations, apparatus 710 may further include a memory 714 coupled to processor 712 and capable of being accessed by processor 712 and storing data therein. In some implementations, apparatus 720 may further include a memory 724 coupled to processor 722 and capable of being accessed by processor 722 and storing data therein. Each of memory 714 and memory 724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 714 and memory 724 may include a type of read-only memory (ROM) such as mask ROM, programmable ROM (PROM), erasable programmable ROM (EPROM) and/or electrically erasable programmable ROM (EEPROM). Alternatively, or additionally, each of memory 714 and memory 724 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 710 and apparatus 720 may be a communication entity capable of communicating with each other using various proposed schemes in accordance with the present disclosure. For illustrative purposes and without limitation, a description of capabilities of apparatus 710, as a UE, and apparatus 720, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 710 as a UE (e.g., UE 110), the same is also applicable to apparatus 720 as a network node or base station such as a gNB, TRP or eNodeB (e.g., network node 125) of a wireless network (e.g., wireless network 120) such as a 5G NR mobile network.

Under a proposed scheme in accordance with the present disclosure with respect to a BFR procedure for SCell in mobile communications, processor 712 of apparatus 710 may detect, via transceiver 716, a beam failure of a serving cell (e.g., a SCell or a SpCell associated with network node 130). Moreover, processor 712 may trigger, via transceiver 716, a BFRQ responsive to the detecting. The BFRQ may remain pending until cancelled. In triggering the BFRQ, processor 712 may generate a BFRQ MAC CE and then transmit the BFRQ MAC CE to a wireless network (e.g., wireless network 120 via apparatus 720 as network node 125) using a resource according to an UL grant.

In some implementations, in generating the BFRQ MAC CE, processor 712 may generate a MAC CE which includes an LCID indicating that the MAC CE pertain to the detected beam failure of the serving cell.

In some implementations, in generating the BFRQ MAC CE, processor 712 may generate a truncated BFRQ MAC CE which omits one or more pieces of information related to the beam failure.

In some implementations, in generating the BFRQ MAC CE, processor 712 may generate a non-truncated BFRQ MAC CE including a first bitmap and a second bitmap. In such cases, the first bitmap (e.g., bitmap of $C_i$) may indicate beam failure detection for which one or more serving cells of a plurality of serving cells, and the second bitmap (e.g., bitmap of $F_i$) may indicate whether new beam information of one or more qualified new beams is provided for one or more serving cells of the plurality of serving cells or for an SR-like indication with beam failure.

In some implementations, in generating the BFRQ MAC CE, processor 712 may generate a short BFRQ MAC CE with information related to the serving cell but not any other serving cell also suffering beam failure.

In some implementations, in generating the BFRQ MAC CE, processor 712 may generate a long BFRQ MAC CE with information related to the serving cell and any other serving cell also suffering beam failure.

In some implementations, the serving cell may include a SpCell. In such cases, in generating the BFRQ MAC CE, processor 712 may generate the BFRQ MAC CE which includes an indication of a serving cell index of the SpCell.

In some implementations, a priority of the BFRQ MAC CE may be lower than a priority of a C-RNTI MAC CE or data from an UL-CCCH and higher than a priority of a configured grant confirmation MAC CE.

In some implementations, a priority of the BFRQ MAC CE may be lower than a priority of a configured grant confirmation MAC CE and higher than a priority of MAC CEs BSRs, with exception of a BSR included for padding.

In some implementations, processor 712 may perform additional operations. For instance, processor 712 may cancel the BFRQ responsive to beam information of the serving cell being included in a MAC PDU which has been transmitted to the wireless network. In cancelling the BFRQ, processor 712 may stop to transmit any further instance of the BFRQ MAC CE to the wireless network.

In some implementations, processor 712 may perform additional operations. For instance, processor 712 may trigger, via transceiver 716, a SR-like indication to inform the wireless network of the beam failure of the serving cell responsive to the detecting. In triggering the SR-like indication, processor 712 may transmit a SR for BFR to the wireless network.

In some implementations, the serving cell may include a SCell. In such cases, in triggering the SR-like indication, processor 712 may trigger the SR-like indication responsive to one or more conditions of a plurality of conditions having been met. The plurality of conditions may include: (a) no UL-SCH resource being available for a new transmission, (b) a MAC entity being configured with configured with one or more UL grants and the apparatus being configured to transmit the SR-like indication (even if configured UL grants are available), and (c) there is UL-SCH resource available, but there is not enough room to include non-truncated BFR MAC CE or truncated BFR MAC CE as a result of a logical channel prioritization (LCP) procedure.

In some implementations, processor 712 may perform additional operations. For instance, processor 712 may cancel the SR-like indication responsive to BFR information for the serving cell being included in a MAC PDU which has been transmitted to the wireless network. In cancelling the SR-like indication, processor 712 may stop to transmit any further instance of the SR for BFR to the wireless network.

Under another proposed scheme in accordance with the present disclosure with respect to a BFR procedure for SCell in mobile communications, processor 712 of apparatus 710 may detect, via transceiver 716, a beam failure of a SCell. Additionally, processor 712 may trigger a BFRQ responsive to the detecting. The BFRQ may remain pending until cancelled.

In some implementations, in triggering the BFRQ, processor 712 may perform certain operations. For instance, processor 712 may generate a BFRQ MAC CE. Moreover, processor 712 may transmit the BFRQ MAC CE to a wireless network using a resource according to an UL grant.

In some implementations, at least one SR configuration dedicated for SCell BFR may be configured for each MAC entity.

In some implementations, in detecting the beam failure of the SCell processor 712 may detect beam failure of a plurality of serving cells. Moreover, in triggering the BFRQ, processor 712 may trigger a respective SR-like indication of a plurality of SR-like indications for a corresponding one of the plurality of serving cells.

In some implementations, the plurality of SR-like indications may share a same SR configuration for SCell BFR.

Alternatively, each of a plurality of SR configurations may be used for a respective one of the plurality of SR-like indications. In such cases, each of a plurality of SR configurations may be for a respective serving cell, a respective PUCCH cell group, a respective cell group or a respective MAC entity.

In some implementations, processor 712 may perform additional operations. For instance, processor 712 may cancel the BFRQ responsive to beam information of the SCell being included in a MAC PDU which has been transmitted to the wireless network. In cancelling the BFRQ, processor 712 may stop to transmit any further instance of the BFRQ MAC CE to the wireless network.

Illustrative Processes

FIG. 8 illustrates an example process 800 in accordance with an implementation of the present disclosure. Process 800 may represent an aspect of implementing various proposed designs, concepts, schemes, systems and methods described above. More specifically, process 800 may represent an aspect of the proposed concepts and schemes pertaining to a BFR procedure for SCell in mobile communications in accordance with the present disclosure. Process 800 may include one or more operations, actions, or functions as illustrated by one or more of blocks 810 and 820 as well as sub-blocks 822 and 824. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed repeatedly or iteratively. Process 800 may be implemented by or in apparatus 710 and apparatus 720 as well as any variations thereof. Solely for illustrative purposes and without limiting the scope, process 800 is described below in the context of apparatus 710 as a UE (e.g., UE 110) and apparatus 720 as a network node (e.g., network node 125) of a wireless network (e.g., wireless network 120) such as a 5G/NR mobile network. Process 800 may begin at block 810.

At 810, process 800 may involve processor 712 of apparatus 710 detecting, via transceiver 716, a beam failure of a serving cell (e.g., a SCell or a SpCell associated with network node 130). Process 800 may proceed from 810 to 820.

At 820, process 800 may involve processor 712 triggering, via transceiver 716, a BFRQ responsive to the detecting. The BFRQ may remain pending until cancelled. In triggering the BFRQ, process 800 may involve processor 712 performing certain operations as represented in 822 and 824.

At 822, process 800 may involve processor 712 generating a BFRQ MAC CE. Process 800 may proceed from 822 to 824.

At 824, process 800 may involve processor 712 transmitting the BFRQ MAC CE to a wireless network (e.g., wireless network 120 via apparatus 720 as network node 125) using a resource according to an UL grant.

In some implementations, in generating the BFRQ MAC CE, process 800 may involve processor 712 generating a MAC CE with an associated LCID indicating that the MAC CE pertain to the detected beam failure of the serving cell.

In some implementations, in generating the BFRQ MAC CE, process 800 may involve processor 712 generating a truncated BFRQ MAC CE which omits one or more pieces of information related to the beam failure.

In some implementations, in generating the BFRQ MAC CE, process 800 may involve processor 712 generating a non-truncated BFRQ MAC CE including a first bitmap and a second bitmap. In such cases, the first bitmap (e.g., bitmap of $C_i$) may indicate beam failure detection for which one or more serving cells of a plurality of serving cells, and the second bitmap (e.g., bitmap of $F_i$) may indicate either: (a) whether new beam information of one or more qualified new beams is provided for one or more serving cells of the plurality of serving cells or (b) whether the new beam information of the one or more qualified new beams is provided for one or more serving cells of the plurality of serving cells with beam failure.

In some implementations, in generating the BFRQ MAC CE, process 800 may involve processor 712 generating a short BFRQ MAC CE with information related to the serving cell but not any other serving cell also suffering beam failure.

In some implementations, in generating the BFRQ MAC CE, process 800 may involve processor 712 generating a long BFRQ MAC CE with information related to the serving cell and any other serving cell also suffering beam failure.

In some implementations, the serving cell may include a SpCell. In such cases, in generating the BFRQ MAC CE, process 800 may involve processor 712 generating the BFRQ MAC CE which includes an indication of a serving cell index of the SpCell.

In some implementations, a priority of the BFRQ MAC CE may be lower than a priority of a C-RNTI MAC CE or data from an UL-CCCH and higher than a priority of a configured grant confirmation MAC CE.

In some implementations, a priority of the BFRQ MAC CE may be lower than a priority of a configured grant confirmation MAC CE and higher than a priority of MAC CEs BSRs, with exception of a BSR included for padding.

In some implementations, process 800 may involve processor 712 performing additional operations. For instance, process 800 may involve processor 712 cancelling the BFRQ responsive to beam information of the serving cell being included in a MAC PDU which has been transmitted to the wireless network. In cancelling the BFRQ, process 800 may involve processor 712 stopping to transmit any further instance of the BFRQ MAC CE to the wireless network.

In some implementations, process 800 may involve processor 712 performing additional operations. For instance, process 800 may involve processor 712 triggering, via transceiver 716, a SR-like indication to inform the wireless network of the beam failure of the serving cell responsive to the detecting. In triggering the SR-like indication, process 800 may involve processor 712 transmitting a SR for BFR to the wireless network.

In some implementations, the serving cell may include a SCell. In such cases, in triggering the SR-like indication, process 800 may involve processor 712 triggering the SR-like indication responsive to one or more conditions of a plurality of conditions having been met. The plurality of conditions may include: (a) no UL-SCH resource being available for a new transmission, (b) a MAC entity being configured with configured with one or more UL grants and the apparatus being configured to transmit the SR-like indication, and (c) there is uplink grant available for a new transmission, but the uplink grant is not enough to carry truncated or non-truncated BFR MAC CE as a result of an LCP procedure.

In some implementations, process 800 may involve processor 712 performing additional operations. For instance, process 800 may involve processor 712 cancelling the SR-like indication responsive to BFR information for the serving cell being included in a MAC PDU which has been transmitted to the wireless network. In cancelling the SR-like indication, process 800 may involve processor 712 stopping to transmit any further instance of the SR for BFR to the wireless network.

Figure 9:
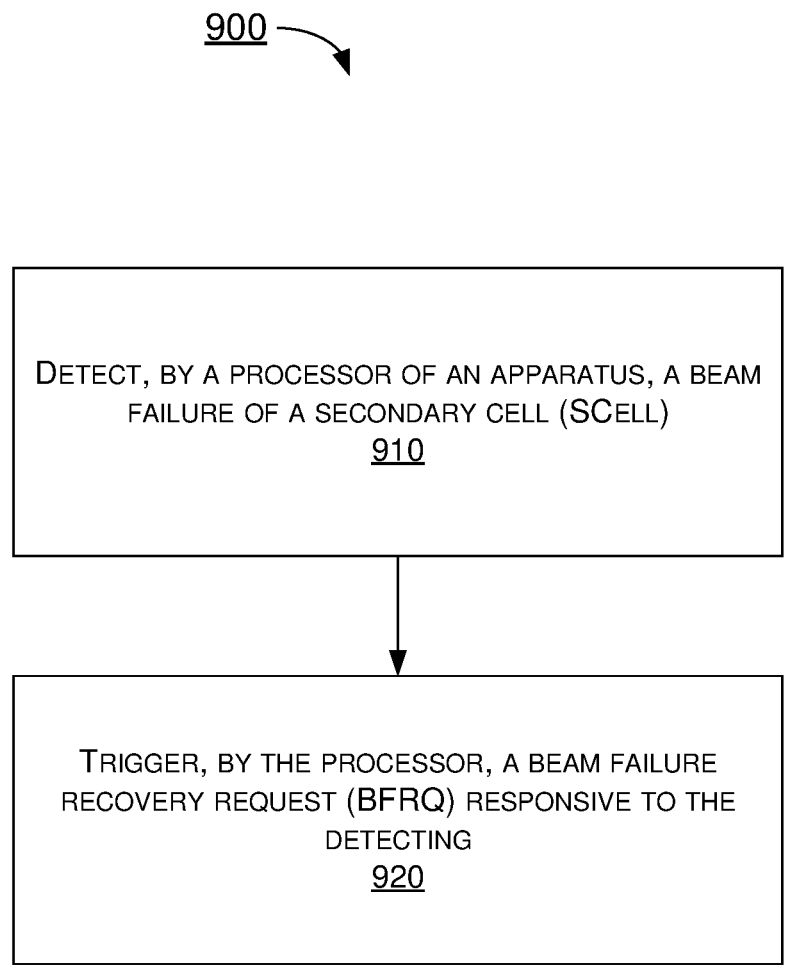
FIG. 9 is a flowchart of an example process in accordance with an implementation of the present disclosure.

FIG. 9 illustrates an example process 900 in accordance with an implementation of the present disclosure. Process 900 may represent an aspect of implementing various proposed designs, concepts, schemes, systems and methods described above. More specifically, process 900 may represent an aspect of the proposed concepts and schemes pertaining to a BFR procedure for SCell in mobile communications in accordance with the present disclosure. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed repeatedly or iteratively. Process 900 may be implemented by or in apparatus 710 and apparatus 720 as well as any variations thereof. Solely for illustrative purposes and without limiting the scope, process 900 is described below in the context of apparatus 710 as a UE (e.g., UE 110) and apparatus 720 as a network node (e.g., network node 125) of a wireless network (e.g., wireless network 120) such as a 5G/NR mobile network. Process 900 may begin at block 910.

At 910, process 900 may involve processor 712 of apparatus 710 detecting, via transceiver 716, a beam failure of a SCell. Process 900 may proceed from 910 to 920.

At 920, process 900 may involve processor 712 triggering a BFRQ responsive to the detecting. The BFRQ may remain pending until cancelled.

In some implementations, in triggering the BFRQ, process 900 may involve processor 712 performing certain operations. For instance, process 900 may involve processor 712 generating a BFRQ MAC CE. Moreover, process 900 may involve processor 712 transmitting the BFRQ MAC CE to a wireless network using a resource according to an UL grant.

In some implementations, at least one SR configuration dedicated for SCell BFR may be configured for each MAC entity.

In some implementations, in detecting the beam failure of the SCell, process 900 may involve processor 712 detecting beam failure of a plurality of serving cells. Moreover, in triggering the BFRQ, process 900 may involve processor 712 triggering a respective SR-like indication of a plurality of SR-like indications for a corresponding one of the plurality of serving cells.

In some implementations, the plurality of SR-like indications may share a same SR configuration for SCell BFR.

Alternatively, each of a plurality of SR configurations may be used for a respective one of the plurality of SR-like indications. In such cases, each of a plurality of SR configurations may be for a respective serving cell, a respective PUCCH cell group, a respective cell group or a respective MAC entity.

In some implementations, process 900 may involve processor 712 performing additional operations. For instance, process 900 may involve processor 712 cancelling the BFRQ responsive to beam information of the SCell being included in a MAC PDU which has been transmitted to the wireless network. In cancelling the BFRQ, process 900 may involve processor 712 stopping to transmit any further instance of the BFRQ MAC CE to the wireless network.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   detecting, by a processor of an apparatus, a beam failure of a secondary cell (SCell);
   triggering, by the processor, a beam failure recovery request (BFRQ) responsive to the detecting; and
   triggering, by the processor, a scheduling request (SR)-like indication to inform the wireless network of the beam failure responsive to the detecting and responsive to one or more conditions of a plurality of conditions having been met,
   wherein the BFRQ for the SCell with beam failure has been triggered and not cancelled, and
   wherein the plurality of conditions comprise:
      a medium access control (MAC) entity being configured with one or more uplink (UL) grants and the apparatus being configured with a physical uplink control channel (PUCCH) resource to transmit the SR-like indication for beam failure recovery, and
      an uplink shared channel (UL-SCH) resource being available for a new transmission, but truncated BFR MAC control element (CE) or non-truncated BFR MAC CE plus its MAC subheader cannot be included in the one or more UL grants due to insufficient UL grant size as a result of a logical channel prioritization (LCP) procedure.

2. The method of claim 1, wherein the generating of the BFRQ MAC CE comprises generating a MAC CE with an associated logical channel identification (LCID) indicating that the MAC CE pertain to the detected beam failure of the serving cell.

3. The method of claim 1, wherein the generating of the BFRQ MAC CE comprises generating a truncated BFRQ MAC CE which omits one or more pieces of information related to the beam failure.

4. The method of claim 1, wherein the generating of the BFRQ MAC CE comprises generating a non-truncated BFRQ MAC CE including a first bitmap and a second bitmap, wherein the first bitmap indicates beam failure detection for which one or more serving cells of a plurality of serving cells, and wherein the second bitmap indicates either whether new beam information of one or more qualified new beams is provided for one or more serving cells of the plurality of serving cells or whether the new beam information of the one or more qualified new beams is provided for one or more serving cells of the plurality of serving cells with beam failure.

5. The method of claim 1, wherein the generating of the BFRQ MAC CE comprises generating a short BFRQ MAC CE with information related to the serving cell but not any other serving cell also suffering beam failure.

6. The method of claim 1, wherein the generating of the BFRQ MAC CE comprises generating a long BFRQ MAC CE with information related to the serving cell and any other serving cell also suffering beam failure.

7. The method of claim 1, wherein the serving cell comprises a special cell (SpCell), and wherein the generating of the BFRQ MAC CE comprises generating the BFRQ MAC CE which includes an indication of a serving cell index of the SpCell.

8. The method of claim 1, wherein a priority of the BFRQ MAC CE is lower than a priority of a cell radio network temporary identifier (C-RNTI) MAC CE or data from an uplink common control channel (UL-CCCH) and higher than a priority of a configured grant confirmation MAC CE.

9. The method of claim 1, wherein a priority of the BFRQ MAC CE is lower than a priority of a configured grant confirmation MAC CE and higher than a priority of MAC CEs for buffer status reports (BSRs), with exception of a BSR included for padding.

10. The method of claim 1, further comprising:
cancelling, by the processor, the BFRQ responsive to beam information of the serving cell being included in a MAC protocol data unit (PDU) which has been transmitted to the wireless network,
wherein the cancelling of the BFRQ comprises stopping to transmit any further instance of the BFRQ MAC CE to the wireless network.

11. The method of claim 1, wherein the plurality of conditions further comprise:
no UL-SCH resource being available for a new transmission.

12. The method of claim 1, further comprising:
cancelling, by the processor, the SR-like indication responsive to BFR information for the serving cell being included in a MAC protocol data unit (PDU) which has been transmitted to the wireless network,
wherein the cancelling of the SR-like indication comprises stopping to transmit any further instance of the SR for BFR to the wireless network.

* * * * *